US010739838B2

(12) United States Patent
Wu et al.

(10) Patent No.: US 10,739,838 B2
(45) Date of Patent: Aug. 11, 2020

(54) QUALITY-DRIVEN DYNAMIC FREQUENCY SCALING FOR ENERGY OPTIMIZATION OF SMART CAMERA SYSTEMS

(71) Applicant: OmniVision Technologies, Inc., Santa Clara, CA (US)

(72) Inventors: Jiyan Wu, Singapore (SG); Jun Wei, Singapore (SG); Haiyang Fang, WuHan (CN); Shunbo Mou, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 287 days.

(21) Appl. No.: 15/856,528

(22) Filed: Dec. 28, 2017

(65) Prior Publication Data

US 2019/0204892 A1 Jul. 4, 2019

(51) Int. Cl.
*G06F 1/324* (2019.01)
*H04N 19/184* (2014.01)
(Continued)

(52) U.S. Cl.
CPC ............ *G06F 1/324* (2013.01); *G06F 1/3228* (2013.01); *G06F 1/3296* (2013.01); *H04N 5/232* (2013.01);
(Continued)

(58) Field of Classification Search
CPC ...... G06F 1/324; G06F 1/3296; G06F 1/3206; G06F 1/3243; G06F 1/325; G06F 1/3215;
(Continued)

(56) References Cited

U.S. PATENT DOCUMENTS 8,934,016 B2 1/2015 Nakamura et al.
9,420,178 B2 8/2016 Park et al.
(Continued)

FOREIGN PATENT DOCUMENTS

CN 101170667 A 12/2007
CN 101461232 A 6/2009
JP 2001054108 A 2/2001

OTHER PUBLICATIONS

Carroll et al., "An Analysis of Power Consumption in a Smartphone," Proceedings of USENIX ATC, 2010, 14 pages.
(Continued)

*Primary Examiner* — Jaweed A Abbaszadeh
*Assistant Examiner* — Brian J Corcoran
(74) *Attorney, Agent, or Firm* — Christensen O'Connor Johnson Kindness PLLC

(57) ABSTRACT

A smart camera system including an image sensor and a controller is presented. The image sensor generates video data that is initially at a bit rate of a pre-determined bit rate value. The controller is coupled to the image sensor to transmit the video data. The controller includes a processor operating at a clock rate of a first frequency. The processor is coupled to memory, the memory including instructions, which when executed by the controller causes the smart camera system to perform operations. The operations include dynamically scaling the clock rate of the processor to an adjustment frequency in response to receiving an input to change the bit rate of the video data. The adjustment frequency for the clock rate of the processor based, at least in part, on the input bit rate value. The operations further include changing the bit rate to the input bit rate value. The input bit rate value being different than the pre-determined bit rate value and the first frequency being different than the adjustment frequency.

21 Claims, 6 Drawing Sheets

(51) Int. Cl.
*H04N 5/232* (2006.01)
*G06F 1/3228* (2019.01)
*G06F 1/3296* (2019.01)

(52) U.S. Cl.
CPC ....... *H04N 5/23241* (2013.01); *H04N 19/184* (2014.11)

(58) Field of Classification Search
CPC .. H04N 19/184; H04N 5/232; H04N 5/23241; H04N 21/234354; H04N 21/44245; H04N 21/6373; H04N 21/6379; H04N 17/004; H04N 19/127; H04N 19/146; H04N 19/147; H04N 19/154; H04N 19/156
See application file for complete search history.

(56) References Cited

U.S. PATENT DOCUMENTS

| | | | | |
|---|---|---|---|---|
| 9,871,959 | B1* | 1/2018 | Hlatky | H04N 5/23206 |
| 2003/0185302 | A1* | 10/2003 | Abrams, Jr. | H04N 5/232 |
| | | | | 375/240.12 |
| 2006/0212247 | A1* | 9/2006 | Shimoyama | G06F 1/3203 |
| | | | | 702/89 |
| 2007/0162780 | A1* | 7/2007 | Wang | G06F 1/3203 |
| | | | | 713/600 |
| 2014/0146186 | A1* | 5/2014 | Ju | H04N 5/23241 |
| | | | | 348/207.1 |
| 2017/0169797 | A1* | 6/2017 | Lundberg | G09G 5/10 |
| 2018/0300839 | A1* | 10/2018 | Appu | G06T 1/20 |
| 2019/0014388 | A1* | 1/2019 | Rutledge | H04N 21/6181 |

OTHER PUBLICATIONS

Le Sueur et al., "Dynamic Voltage and Frequency Scaling: The Laws of Diminishing Returns," Proceedings of the 2010 international conference on Power aware computing and systems, 2010, 5 pages.
Hu et al., "Energy-Aware Video Streaming on Smartphones," 2015 IEEE Conference on Computer Communications (INFOCOM), pp. 1185-1193.
Marković et al., "Methods for True Energy-Performance Optimization," IEEE Journal of Solid-State Circuits, vol. 39, No. 8, Aug. 2004, pp. 1282-1293.
Wang et al., "Networked Drone Cameras for Sports Streaming," 2017 IEEE 37th International Conference on Distributed Computing Systems, pp. 308-318.
Xie et al., "piStream: Physical Layer Informed Adaptive Video Streaming Over LTE," GetMobile, Apr. 2016, vol. 20, Issue 2, pp. 31-34. Excerpted from "piStream: Physical Layer Informed Adaptive Video Streaming over LTE," from Proceedings of the 21st Annual International Conference on Mobile Computing and Networking, ACM 2015.
Zhang et al., "The Design and Implementation of a Wireless Video Surveillance System," MobiCom 15, Sep. 7-11, 2015, Paris, France, 2015 ACM, pp. 426-438.
PRC (China) Patent Application No. 201811598928.9—Office Action with English Translation dated Jun. 3, 2020, 10 pages.

* cited by examiner

QUALITY-DRIVEN DYNAMIC FREQUENCY SCALING FOR ENERGY OPTIMIZATION OF SMART CAMERA SYSTEMS

TECHNICAL FIELD

This disclosure relates generally to video transmission systems, and in particular but not exclusively, relates to real-time video transmission with smart camera systems.

BACKGROUND INFORMATION

Video transmission over communication networks enables users to access live video remotely. For example, video streaming services such as YouTube and Twitch enable users to live-stream, e.g., real-time video transmission, from a camera or webcam over the internet remotely to viewers. However, real-time video transmission suffers from many pitfalls. For example, real-time video transmission over unreliable communication networks may incur various image quality problems, e.g., missing or distorted frames, freezing, stalls, interruptions, etc. These issues may be caused by bandwidth fluctuations, inadequate bandwidth, packet losses, and/or sender-side or receiver-side buffer underflow/overflow. Other issues that may hinder the transmission of the video include delay constraint, reliability requirements, throughput demand, network dynamics, etc.

BRIEF DESCRIPTION OF THE DRAWINGS

Non-limiting and non-exhaustive examples of the invention are described with reference to the following figures, wherein like reference numerals refer to like parts throughout the various views unless otherwise specified.

Figure 1A:
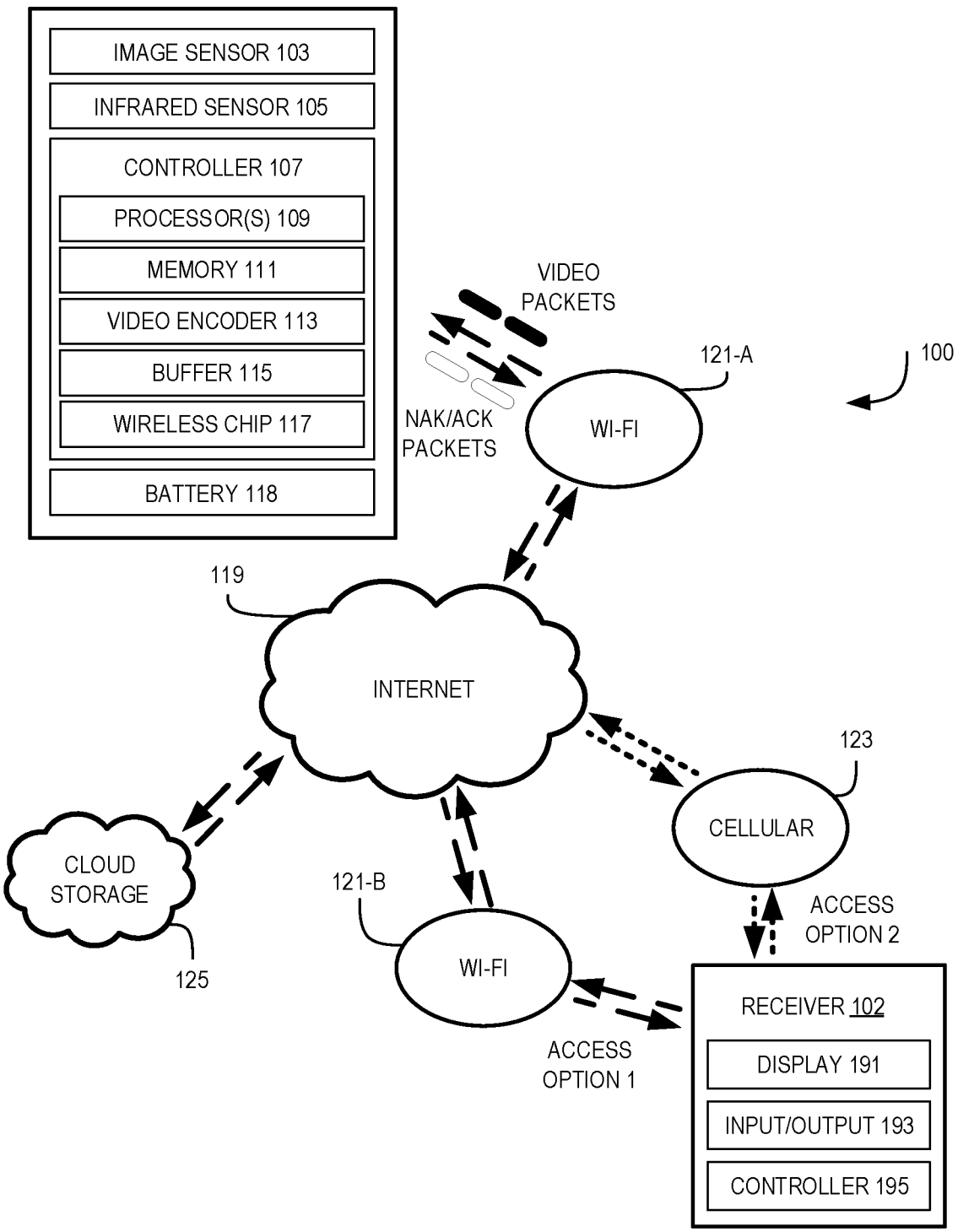
FIG. 1A is an example video transmission system in accordance with an embodiment of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Examples of an apparatus, system, and method for dynamic frequency scaling and energy optimization during video transmission are described herein. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

In some embodiments, a smart camera system is employed to intelligently stream real-time and recorded videos. The smart camera system enables an end user to view an external scene captured by an image sensor included in the smart camera system that may otherwise be out of the end user's immediate field of view. The real-time and recorded videos may be captured during normal (e.g., bright, day time, etc.) lighting conditions in which a full array of red, green, and blue colors may be captured by the image sensor. Alternatively, the videos may be captured during low light (e.g., dim, night time, etc.) lighting conditions by detecting infrared (IR) light with the image sensor. In some embodiments, the smart camera system may detect motion with the smart camera system which may be included in the videos captured during normal and low light conditions. The smart camera system may store recorded videos on a local storage element (e.g., a secure digital card, a compact flash card, a USB memory stick and the like). In some embodiments, the smart camera system may be wirelessly communicatively coupled with the end user (e.g., via a cellphone over Wi-Fi or a cellular network) in order to provide the real-time and recorded videos.

In the various embodiments, the smart camera system may utilize a battery or capacitor to provide power to the various components (e.g., image sensor, processor, wireless chip, and the like). However, the battery or capacitor of the smart camera system may have a limited energy capacity. Therefore, efficiently utilizing the limited power capacity of the battery or capacitor of the smart camera system is desired in order to maintain an expected operational duration and quality of video streaming or transmission. In the various embodiments, dynamic frequency scaling (e.g., of a clock rate of the processor included in the smart camera system)

based on the quality or bit rate of the videos being streamed or transmitted is utilized for energy optimization of the smart camera system. The dynamic frequency scaling make take into account the complex power utilization of the smart camera system (e.g., audio and video processing, data writing, wireless transmission, motion detection, and the like).

FIG. 1 is an example video transmission system 100 in accordance with an embodiment of the present disclosure. The video transmission system 100 (system 100 for short) illustrates a smart camera 101 transmitting video data (e.g., video packets) to receiver 102. The video data may include a live video of an external scene to the smart camera 101 or a pre-recorded video. The system includes the smart camera 101, the receiver 102, internet 119, two or more Wi-Fi access points 121, a cellular network access point 123, and cloud storage 125. As illustrated, the smart camera 101 and the receiver 102 are communicatively coupled to each other via a wired (e.g., Ethernet) or wireless (e.g., Wi-Fi, Bluetooth, LTE, HSDPA, and the like) communication standard. The system 100 may provide for real-time video transmission (e.g., of communication data, video data, and the like) from the smart camera 101 to the receiver 102 with a limited delay constraint. The limited delay constraint may be, at least partially, due to the physical distance between the smart camera 101 and the receiver 102, and the physical medium in which the transmission is based. For example, a duration between when the smart camera 101 generates the video data (e.g., by recording or capturing video of an external scene) and the receiver 104 receives the video data may be less than 300 ms. In some embodiments the smart camera 101 may be a security camera, video doorbell, webcam, a laptop computer, a smartphone, an action camera, and the like. Similarly, in some embodiments the receiver 102 may be a desktop computer, a laptop computer, a tablet, a smartphone, and the like.

As illustrated, the smart camera 101 includes an image sensor 103 (e.g., CCD, CMOS sensor, or other light sensitive structure that converts an optical signal into an electronic signal), an infrared (IR) sensor 105 (e.g., a passive IR sensor including a pyroelectric IR detector and supporting circuitry, an active IR sensor including one or more IR emitters such as IR light emitting diodes and an IR receiver or sensor such as a pyroelectric IR detector, and the like), a controller 107, and a battery 118 (e.g., a rechargeable or non-rechargeable battery such as a capacitor, an alkaline battery, a lithium air battery, a lithium ion battery, a lithium ion polymer battery, a lead-acid battery, a zinc-air battery, a fuel cell, and the like). The controller 107 includes one or more processors 109 (e.g., electronic circuit or circuits to perform or carry out instructions or operations), memory 107 (e.g. volatile and non-volatile memory such as flash memory, RAM, ROM, DRAM, SRAM, NVRAM, NRAM, RRAM, and the like), a video encoder 113 (e.g., implemented in hardware as an application specific integrated circuit, ASIC, or in software as a series of instructions or instructions sets to be executed by the one or more processors 109), a buffer 115 (e.g., as memory separate from memory 107 or included as a portion of memory 107), and a wireless chip 117 (e.g., an ASIC or system on a chip for wireless communication using various wireless standards such as Bluetooth, Wi-Fi, HSDPA, LTE, 3G, 4G, and the like). The receiver 102 includes a display 191 (e.g., a liquid crystal display, a light emitting diode display, an organic light emitting diode display, an electroluminescent display, a plasma display panel, a laser-based display, a quantum dot display, and the like), an input/output device 193 (e.g., a mouse, a keyboard, a touchscreen, a touchpad, one or more buttons, levels or switches, and the like), and a controller 195. In some embodiments, the controller 195 may include the same or similar features as controller 107 of smart camera 101. In the same or other embodiments, smart camera 101 and receiver 102 may each include the same or similar features/components as discussed above individually. For example, the receiver 102 may include one or more processors, memory, video encoder, buffer, and wireless chip comparable to the same elements or components as smart camera 101. Additionally, the smart camera 101 may include a display (e.g., to display video data captured by image sensor 103) and one or more input/output devices.

In the illustrated embodiment, the image sensor 103 and the infrared sensor 105 are coupled to the controller 107. The one or more processors 109 of the controller 107 are coupled to the memory 111, the video encoder 113, the buffer 115, and the wireless chip 117. The image sensor 103 generates video data (e.g., when capturing or recording videos of an external scene) initially at a bit rate of a pre-determined bit rate value. The bit rate at the pre-determined bit rate value may correspond to uncoded or uncompressed video data, which is dependent on a resolution, color depth, and a frame rate of the video data generated by the image sensor 103. The pre-determined bit rate value may be an initial or default bit rate value for the image sensor 103 to generate the video data. In other embodiments, the pre-determined bit rate value may be based on a previous input from a user of the system 100 (e.g., the user of the receiver 102). For example, the image sensor 103 may generate video data having 8-bit color depth with a 1280 pixels by 720 pixels (e.g., 720 p) resolution at 25 frames per second (fps), which may correspond to the pre-determined bit rate value of approximately 5 megabits per second (Mbps). Furthermore, it is appreciated that the pre-determined bit rate value of 5 Mbps is merely an example, and that the pre-determined bit rate value may be determined, at least in part, by the hardware capabilities of the image sensor 103 in combination with other factors (e.g., the previous input from the user selecting user defined values of resolution, color depth, and/or frame rate for generating the video data).

The controller 107 is coupled to the image sensor 103, the infrared sensor 105, and the battery 118 to receive the video data and subsequently transmit the video data (e.g., for real-time or otherwise streaming of the video data) with the wireless chip 117 to the user (e.g., of the receiver 102). The battery 118 is coupled to power the various component of the smart camera 101 such as the image sensor 103, the infrared sensor 105, and the controller 107. However, the battery 118 may be a capacity limited energy storage device. Thus, a total runtime of the smart camera 101 may be based, at least in part, on the amount of energy stored within the battery 118. Therefore, increased energy optimization and efficiency of the smart camera 101 may allow for a reduced consumption of the energy stored within the battery 118 and result in overall increased runtime duration of the smart camera 101.

In some embodiments, the smart camera 101 is transmitting the video data (e.g., of a live view of the external scene or a pre-recorded video) initially at the bit rate of the pre-determined bit rate value. While transmitting the video data having the bit rate at the pre-determined bit rate value, the one or more processors 109 of the controller 107 operate at a clock rate of a first frequency. The one or more processors 109 are coupled to the memory 111, the memory 111 including instructions, which when executed by the controller 107 causes the smart camera 101 to perform operations. For example, the user (e.g., of the receiver 102) may generate an input received by the smart camera 101 to change the bit rate of the video data to an input bit rate value. The operations may include a first set of instructions that change the bit rate of the video data in response while also maintaining the energy optimization of the smart camera 101. For example, in response to receiving the input to change the bit rate of the video data to the input bit rate value, the operations may include dynamically scaling the clock rate of the one or more processors 109 to an adjustment frequency. The adjustment frequency based, at least in part, on the input bit rate value. The operations then include changing the bit rate of the video data being transmitted to the input bit rate value. The input bit rate value being different than the pre-determined bit rate value, and the first frequency being different than the adjustment frequency. Dynamically scaling the frequency of the clock rate of one or more processor 109 based on input bit rate value may allow for increased energy optimization of the smart camera 101. In some embodiments, the smart camera 101 may receive a plurality of inputs to change the bit rate of the video data in sequence over a first time period. The smart camera 101 may accordingly adjust the frequency for the clock rate of the one or more processors 109 and the bit rate of the video data in response each of the plurality of inputs.

In the illustrated embodiment of system 100, the smart camera 101 transmits the video data (e.g., video packets with NAK/ACK transmission scheme to indicate receipt or non-receipt of the video packets) to the receiver 102. The smart camera 101 may transmit the video data as video packets, transmission packets, and the like. The video packets may propagate through various paths from the smart camera 101 to the receiver 102. For example, the video packets may first be provided to the Wi-Fi access point 121-A before propagating to and through the internet 119. As the video packets exit the internet 119 on their way to the receiver 102, the video packets may go through the Wi-Fi access point 121-B or the cellular network (e.g., LTE, HSDPA, 3G, 4G, etc.) access point 123. In some embodiments, the cellular network access point 123 utilizes a 4G LTE based communication protocol. In response to the video packets, the receiver 102 may transmit an acknowledgement (ACK) packet and/or negative acknowledgement (NAK) packet to the smart camera 101 to indicate whether the video packet was received or was not received. In some embodiments, the video data may be transmitted to the cloud storage 125 accessed via the internet 119. The cloud storage 125 may be a remotely hosted storage service (e.g., One Drive, Google Drive, Dropbox, and the like) for uploading and storing the video data. In the same embodiments, the user of the receiver 102 may instruct the smart camera 101 to transmit the video data stored within the cloud storage 125. In other embodiments, the smart camera 101 may transmit the video data to the cloud storage 125 in addition to, or instead of, the receiver 102.

Figure 1B:
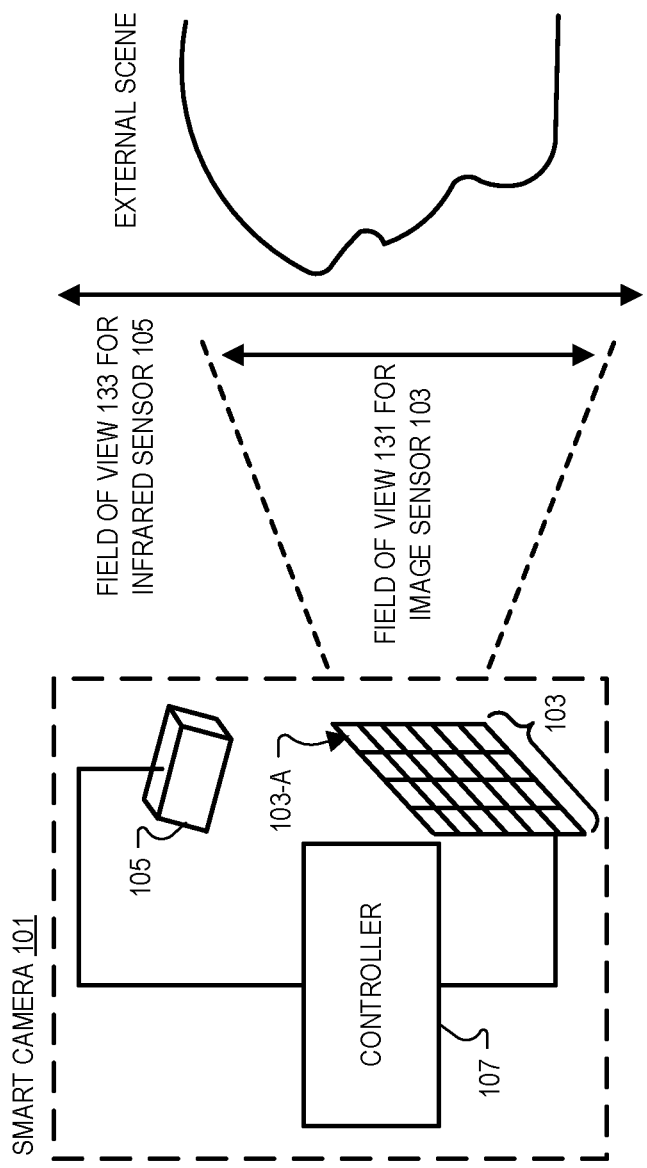
FIG. 1B is an example illustration of a smart camera included in the video transmission system of FIG. 1A in accordance with an embodiment of the present disclosure.

FIG. 1B is an example illustration of the smart camera 101 included in the video transmission system 100 of FIG. 1A in accordance with an embodiment of the present disclosure. As illustrated, the controller 107 is coupled to the image sensor 103 and the IR sensor 105. The image sensor 103 includes a plurality of pixels (e.g., photodiodes) arranged in an array and positioned to capture images or videos (e.g., the video data) of an external scene that lies in a field of view 131 of the image sensor 103. In some embodiments, the image sensor 103 may detect motion (e.g., as motion information) with the assistance of the IR sensor 105. The IR sensor 105 is positioned proximate to the image sensor 103 to detect motion within a field of view 131 of the image sensor 103. Thus, the IR sensor 105 has a field of view 133 that at least partially, overlaps with the field of view 131 of the image sensor 103.

In some embodiments, the IR sensor 105 is a passive IR (PIR) sensor. The PIR sensor 105 measures IR light radiating from objects (e.g., within the external scene) within the field of view 133. Thus, the PIR sensor 105 may generate motion information to be included with the video data to indicate whether or not motion has been detected. In other embodiments, the PIR sensor 105 may generate IR video data based, at least in part, on the PIR sensor 105 data. In some embodiments, the IR sensor 105 may be an active IR sensor 105 such that the smart camera 101 includes one or more IR lights (e.g. light emitting diodes) to generate IR light that reflects off the objects within the external scene back to the image sensor 103. In this particular embodiment, the image sensor 103 may detect light within a wavelength of the visible range (e.g., 390 nm-700 nm) and the infrared range (e.g., 700 nm-1000 nm). Thus the image sensor 103 of the smart camera 101 may capture video under various lighting conditions (e.g., day and night).

Figure 2:
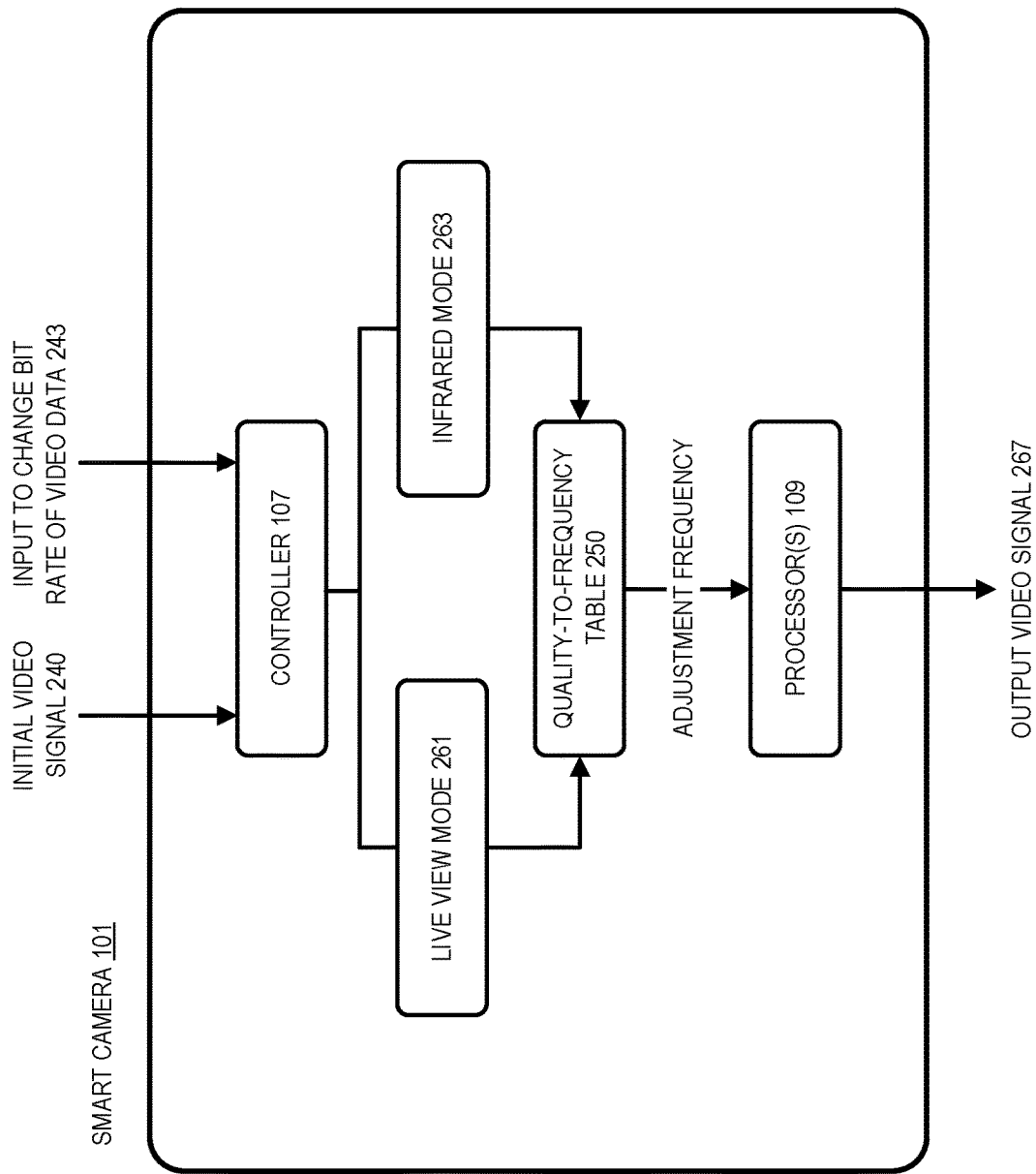
FIG. 2 is an example illustration of a flow diagram representing a video signal propagating through the smart camera of FIG. 1A for transmission to a receiver in accordance with an embodiment of the present disclosure.

FIG. 2 is an example illustration of a flow diagram representing a video signal propagating through the smart camera 101 of FIG. 1A for transmission of the video data to a receiver (e.g., the receiver 102 of FIG. 1A) in accordance with an embodiment of the present disclosure. As illustrated, smart camera 101 receives an initial video signal 240 representing the video data being transmitted initially at the bit rate of the pre-determined bit rate value. The smart camera 101 also receives the input to change the bit rate of the video data 243 to the input bit rate value. It is appreciated that while transmitting the video data initially at the pre-determined bit rate value, the one or more processors 109 may operate at the clock rate of the first frequency. In response to receiving the input, the controller 107 then determines if the smart camera 101 is operating in live view mode 261 or infrared mode 263 to take into account additional hardware elements that may impact the energy usage of the smart camera 101. For example, while in infrared mode 263, the smart camera 101 may require additional energy to power IR light emitting diodes or a PIR sensor (e.g., IR sensor 105 illustrated in FIG. 1A). After the mode of operation for the smart camera 101 is determined, a quality-to-frequency table 250 is utilized to determine the adjustment frequency of the one or more processors 109 of the smart camera 101. The smart camera 101 may then change the bit rate of the video data to the input bit rate value, adjust the clock rate of the one or more processors 109 to the adjustment frequency, and generate an output video signal 267 representative of the video data having the bit rate at the input bit rate value 243. A receiver (e.g., the receiver 102 of FIG. 1A) may receive the output video signal and display (e.g., via display 191 of FIG. 1A) the video data.

The quality-to-frequency table 250 correlates a plurality of potential clock rates for the clock rate of the one or more processors 109 to a corresponding one of a plurality of potential bit rate values for the bit rate of the video data. The plurality of potential clock rates may be possible operational frequencies of the clock rate for the one or more processors 109 of the smart camera 101. The smart camera 101 may utilize a differing amount of energy or power (e.g., of the battery 118 illustrated in FIG. 1A) dependent on the clock rate. The plurality of potential bit rate values may be possible bit rates to transmit the video data that a user of the device may select. For example, the plurality of potential bit rates may include an HD bit rate value (e.g., 720 p), a normal bit rate value (e.g., 640 p), and a basic bit rate value (e.g., 384 p). The plurality of potential clock rates includes the first frequency and the plurality of potential bit rate values includes the pre-determined bit rate value. Each of the plurality of potential bit rate values may be correlated with a corresponding one of the plurality of potential clock rates to increase energy efficiency of the smart camera 101.

In some embodiments, the smart camera 101 may be capable of transmitting the video data at various clock rates included in the plurality of potential clock rates. However, the smart camera 101 may consume varying amounts of energy (e.g., of the battery 118 illustrated in FIG. 1A) while the one or more processors 109 operate at different clock rates. Thus, to increase energy consumption efficiency, the smart camera 101 may adjust the clock rate based on the bit rate of the video data while transmitting the video data. For example, the smart camera 101 may be able to transmit video data at the bit rate of 1.5 megabits per second (Mbps) while the one or more processors operate at both 150 MHz and 180 MHz. However, since 150 MHz is less than 180 MHz, the quality-to-frequency look up table 250 may correlate 150 MHz to 1.5 Mbps. In some embodiments, the quality-to-frequency table 250 may correlate each one of the plurality of potential bit rate values to an associated minimum operating frequency necessary for the smart camera 101 to transmit the video data at the corresponding bit rate value. The minimum operating frequency may corresponding to a clock rate threshold for a particular bit rate value of the video data in which all the modules and functions (e.g., motion detection, capturing the video data including audio data, writing and storing the video data in memory, and transmitting the video data at the particular bit rate value, and the like) of the smart camera 101 operate normally.

Figure 3:
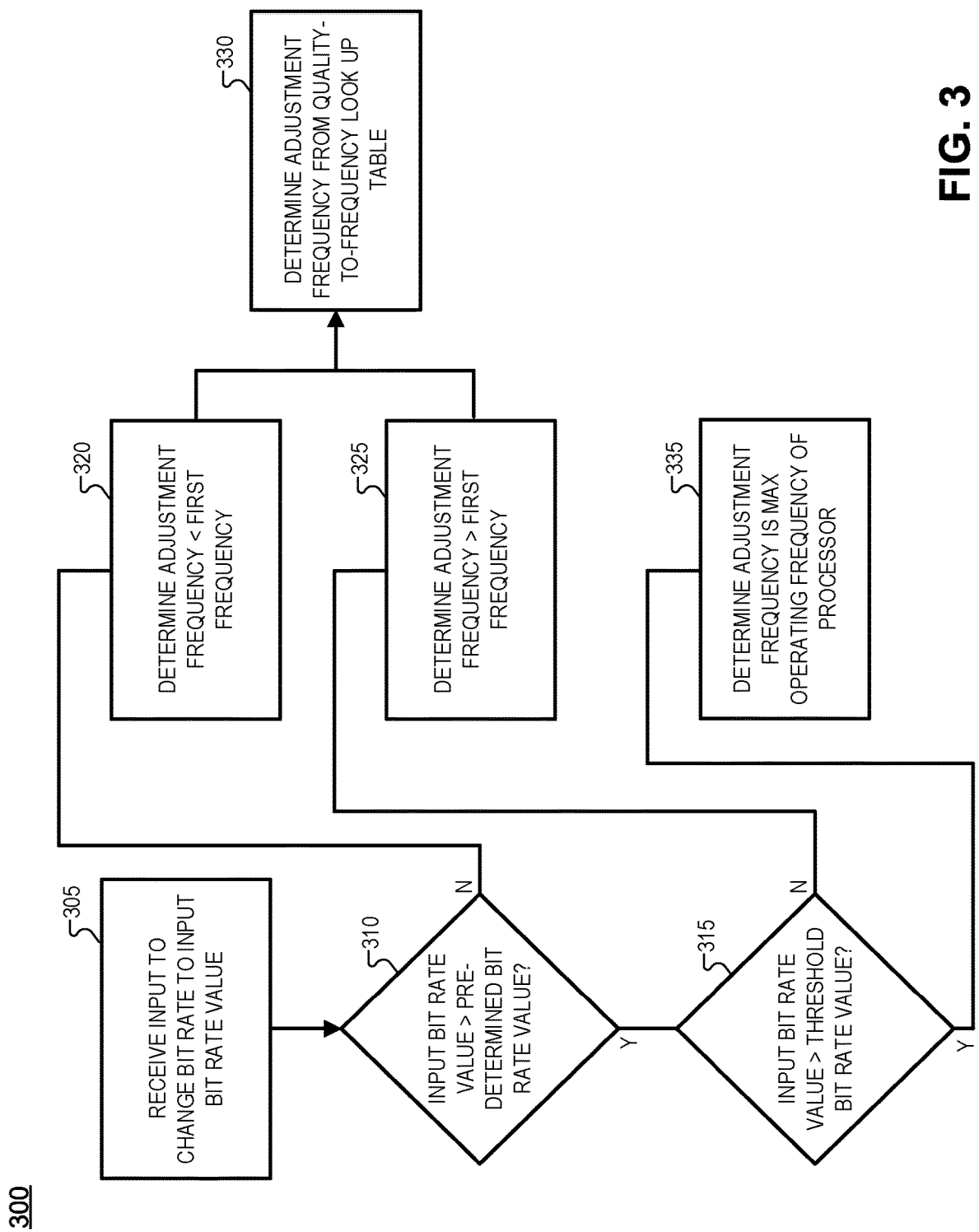
FIG. 3 illustrates an example flow diagram that shows a method for changing a frequency of a clock rate of a processor included in the smart camera of FIG. 1A in response to receiving an input to change a bit rate of video data in accordance with an embodiment of the present disclosure.

FIG. 3 illustrates an example flow diagram that shows a method 300 for changing a frequency of the clock rate of the one or more processors 109 included in the smart camera 101 of FIG. 1A in response to receiving the input to change the bit rate of the video data in accordance with an embodiment of the present disclosure. The illustrated flow diagram may correspond to the smart camera 101 illustrated in FIG. 1A transmitting the video data initially at the pre-determined bit rate value while the one or more processors 109 operate initially at the first frequency.

Referring back to FIG. 3, block 305 depicts receiving an input to change the bit rate of the video data to the input bit rate value. The input may be received from a user of the system (e.g., the smart camera 101 of FIG. 1A). When the input bit rate value is less than (e.g., not greater than) the pre-determined bit rate value, the flow chart proceeds block 320. Based on the input bit rate value being less than (e.g., not greater than) the pre-determined bit rate value, block 320 illustrates determining the adjustment frequency for the clock rate of the processor is less than the first frequency. Block 320 then proceeds to block 330 to determine the adjustment frequency from the quality-to-frequency look-up table or quality-to-frequency map. The bit rate of the video data being transmitted is accordingly changed to the input bit rate value and the clock rate of the processor is changed to the adjustment frequency. Thus the power consumption of the smart camera is less when transmitting the video data with the bit rate at the input bit rate value relative to the power consumption of the smart camera when transmitting the video data with the bit rate at the pre-determined bit rate value.

When the input bit rate value is greater than the pre-determined bit rate value, block 310 proceeds to block 315. Block 315 illustrates comparing the input bit rate value to a threshold bit rate value. When the input bit rate value is greater than the threshold bit rate value, the flow diagram proceeds from block 315 to block 335. Block 335 determines the adjustment frequency is a maximum operating frequency for the clock rate of the processor (e.g., the one or more processors 109 of the smart camera 101 illustrated in FIG. 1A). The maximum operating frequency may be a physical limitation to the frequency of the clock rate to ensure the processor remains in operating conditions. For example, if the maximum operating frequency is set too high of a value, the processor operation may become unstable, for example, due to thermal stress. The bit rate of the video data being transmitted is accordingly changed to the input bit rate value and the clock rate of the processor is changed to the adjustment frequency.

When the input bit rate value is less than (e.g., not greater than) the threshold bit rate value, the flow diagram proceeds from block 315 to block 325. Based on the input bit rate value being greater than the pre-determined bit rate value and, in some embodiments, less than the threshold bit rate value, block 325 illustrates determining the adjustment frequency for the clock rate of the processor is greater than the first frequency. Block 325 then proceeds to block 330 to determine the adjustment frequency from the quality-to-frequency look-up table or quality-to-frequency map. The bit rate of the video data being transmitted is accordingly changed to the input bit rate value and the clock rate of the processor is changed to the adjustment frequency. Accordingly, the power consumption of the smart camera is greater when transmitting the video data with the bit rate at the input bit rate value relative to the power consumption of the smart camera when transmitting the video data with the bit rate at the pre-determined bit rate value.

It is appreciated that block 320 and block 325 proceed to block 330. Block 330 refers to determining the adjustment frequency from the quality-to-frequency look up table. The quality-to-frequency look up table correlates the plurality of potential clock rates for the clock rate of the processor to a corresponding one of the plurality of potential bit rate values for the bit rate of the video data. The plurality of potential clock rate values may include the first frequency and the maximum operating frequency. The plurality of potential bit rate values may include the pre-determined bit rate value, the input bit rate value, and the threshold bit rate value. Block 330 may include identifying a first one of the plurality of potential bit rate values of the quality-to-frequency look up table that corresponds to the input bit rate value. The adjustment frequency for the clock rate of the processor may then be determined as one of the plurality of potential clock rates that corresponds to the first one of the plurality of potential bit rate values.

Figure 4:
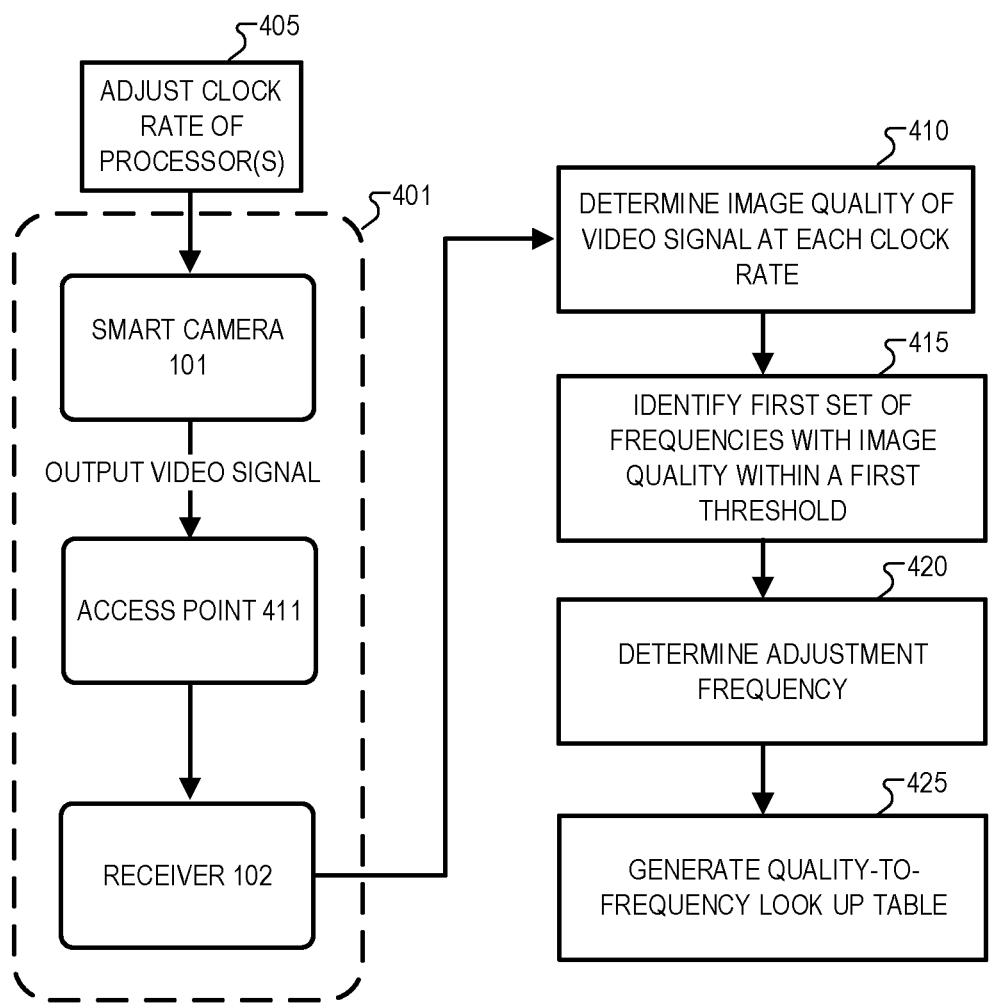
FIG. 4 illustrates an example flow diagram that shows a method for generating a quality-to-frequency look up table in accordance with an embodiment of the present disclosure.

FIG. 4 illustrates an example flow diagram that shows a method 400 for generating a quality-to-frequency look up table in accordance with an embodiment of the present disclosure. As illustrated, system 401 includes the smart camera 101, access point 411, and the receiver 102. The smart camera 101 may be communicatively coupled to the receiver 102 via access point 411. The illustrated flow diagram may utilize the smart camera 101 and the receiver 102 as illustrated in FIG. 1A. Access point 411 may be similar or the same as the access points included in video transmission system 100 of FIG. 1A.

As illustrated, the smart camera 101 outputs a video signal representative of the video data with the controller (e.g., the controller 107 of FIG. 1A). The video data is initially output at the bit rate of the pre-determined bit rate value while the processor (e.g., the one or more processors 109 of FIG. 1A) operates at the clock rate of the first frequency. The first frequency may correspond to the maximum operating frequency of the smart camera 101. While outputting the video signal, the clock rate of the processor is adjusted to a plurality of other frequencies, each different than the first frequency, as illustrated in block 405. The receiver 102 receives the output signal while the frequency of the clock rate is adjusted.

Block 410 illustrates determining image quality of the video signal at each of the clock rates (e.g., the first frequency and the plurality of other frequencies). The image quality of the video signal while the clock rate of the processor is at the first frequency may be compared to the image quality of the video signal while the clock rate of the processor is at each of the plurality of other frequencies. The image quality may utilize an average peak signal-to-noise ratio as a metric to determine the image quality. For example, block 410 may include determining a plurality of average peak signal-to-noise ratios (PSNR) of the video signal, each of the average PSNRs associated a corresponding one of the plurality of other frequencies. The first frequency may be associated with a first average PSNR.

Block 415 illustrates identifying a first set of frequencies included in the plurality of other frequencies associated with substantially similar image quality relative to the image quality associated with the first frequency. For example, the PSNR associated with each of the other frequencies may be compared to the first average PSNR associated with the first frequency. When a corresponding one of the average PSNR of the plurality of other frequencies is to within a first threshold confidence interval of the first average PSNR, the corresponding one of the other frequencies may be identified as having substantially similar image quality as the first frequency and thus be included in the first set of frequencies. In some embodiments the first threshold confidence interval is a 95% threshold confidence interval.

Block 420 illustrates determining the adjustment frequency included in the first set of frequencies. The adjustment frequency identified as being less than any other one of the plurality of other frequencies. Block 425 illustrates generating a quality-to-frequency look up table based on blocks 405-420. The process depicted in blocks 405-420 may be repeated while transmitting the video data at various bit rate values. Thus different frequencies of the clock rate of the processor within the smart camera 101 may be associated with corresponding bit rates. Based on this association, the quality-to-frequency look up table may be generated.

Figure 5:
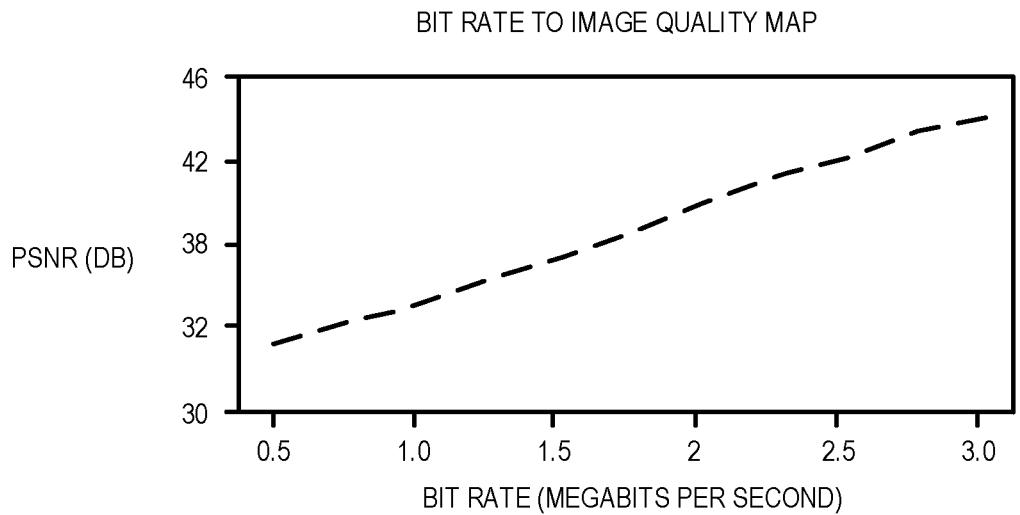
FIG. 5 illustrates an example bit rate to image quality map and bit rate to frequency map based, at least in part, on the quality-to-frequency look up table of FIG. 4, in accordance with an embodiment of the present disclosure.
Figure 5:
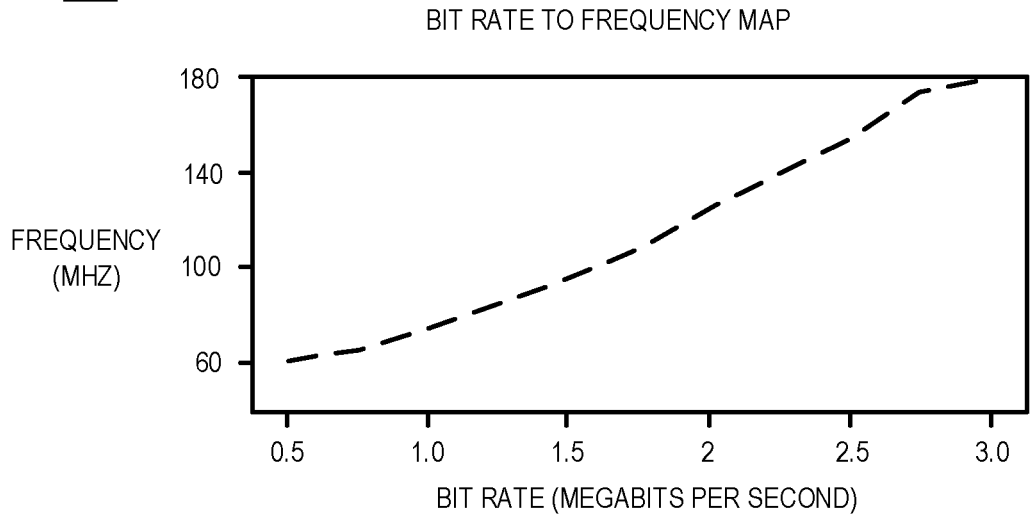

FIG. 5 illustrates an example bit rate to image quality map and bit rate to frequency map based, at least in part, on the quality-to-frequency look up table of FIG. 4, in accordance with an embodiment of the present disclosure. Chart 500 illustrates a bit rate to image quality map which correlates PSNR to bit rate based on the data gathered during method 400 of FIG. 4. The bit rate of the output video signal received by the receiver (e.g., receiver 102 of FIG. 4) is compared to the measured PSNR to generate individual data points within chart 500. Interpolation between one or more data points, smoothing, regression, and the like may be used for curve fitting (e.g., spline, least squares, and the like) to generate a correlation between possible bit rates of the video data (e.g., from the output video signal) and an expected PSNR value.

Chart 550 illustrates a bit rate to frequency map based on the quality-to-frequency look up table generated, for example, by method 400 of FIG. 4. As illustrated, chart 550 correlates frequency for the clock rate of the processor (e.g., the one or more processors 109 of smart camera 101 illustrated in FIG. 1) with the bit rate of the video data. Interpolation between one or more data points, smoothing, regression, and the like for curve fitting (e.g., spline, least squares, and the like) may then be utilized to generate a correlation between possible bit rates of the video data (e.g., from the output video signal) and a frequency of the clock rate for the processor that maintains operational stability of the smart camera 101 while also reducing power consumption.

The processes explained above are described in terms of computer software and hardware. The techniques described may constitute machine-executable instructions embodied within a tangible or non-transitory machine (e.g., computer) readable storage medium, that when executed by a machine (e.g., controller 107 of FIG. 1A) will cause the machine to perform the operations described. Additionally, the processes may be embodied within hardware, such as an application specific integrated circuit ("ASIC"), field programmable gate array (FPGA), or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. A smart camera system, the system comprising:
an image sensor to generate video data, wherein the video data is initially at a bit rate of a pre-determined bit rate value; and
a controller coupled to the image sensor to transmit the video data, wherein the controller includes a processor operating at a clock rate of a first frequency, and wherein the processor is coupled to memory, the memory including instructions, which when executed by the controller causes the smart camera system to perform operations including:
in response to receiving an input to change the bit rate of the video data to an input bit rate value, dynamically scaling the clock rate of the processor to an adjustment frequency, wherein the adjustment frequency for the clock rate of the processor is based, at least in part, on the input bit rate value;
selecting the adjustment frequency from a set of frequencies for the clock rate of the processor associated with substantially similar image quality at the input bit rate of the video data, and wherein the adjustment frequency is less than any other one of the set of frequencies; and changing the bit rate to the input bit rate value, wherein the input bit rate value is different than the pre-determined bit rate value, and wherein the first frequency is different than the adjustment frequency.

2. The system of claim 1, further comprising:

a passive infrared sensor positioned proximate to the image sensor to detect motion within a field of view of the image sensor, wherein the passive infrared sensor is coupled to the controller, and wherein the video data includes motion information generated by the passive infrared sensor.

3. The system of claim 1, wherein the memory includes additional instructions, which when executed by the controller causes the system to perform further operations including:

based on the input bit rate value being less than the pre-determined bit rate value, determining the adjustment frequency for the clock rate of the processor is less than the first frequency, and wherein a power consumption of the smart camera system is less when transmitting the video data with the bit rate at the input bit rate value relative to the power consumption of the smart camera system when transmitting the video data with the bit rate at the pre-determined bit rate value.

4. The system of claim 1, wherein the memory includes additional instructions, which when executed by the controller causes the system to perform further operations including:

based on the input bit rate value being greater than the pre-determined bit rate value, determining the adjustment frequency for the clock rate of the processor is greater than the first frequency, and wherein a power consumption of the smart camera system is greater when transmitting the video data with the bit rate at the input bit rate value relative to the power consumption of the smart camera system when transmitting the video data with the bit rate at the pre-determined bit rate value.

5. The system of claim 1, wherein the pre-determined bit rate value of the bit rate for the video data is a previously inputted bit rate value received by the controller.

6. The system of claim 1, wherein the memory further includes:

a quality-to-frequency look up table which correlates a plurality of potential clock rates for the clock rate of the processor to a corresponding one of a plurality of potential bit rate values for the bit rate of the video data, wherein the plurality of potential clock rates includes the first frequency and the adjustment frequency, and wherein the plurality of potential bit rate values includes the pre-determined bit rate value and the input bit rate value.

7. The system of claim 6, wherein the memory includes additional instructions, which when executed by the controller causes the system to perform further operations including:

identifying a first one of the plurality of potential bit rate values of the quality-to-frequency look up table that corresponds to the input bit rate value; and determining the adjustment frequency for the clock rate of the processor as one of the plurality of potential clock rates that corresponds to the first one of the plurality of potential bit rate values.

8. The system of claim 6, wherein the plurality of potential clock rates includes a maximum operating frequency for the clock rate of the processor, wherein a second one of the plurality of potential bit rate values is a threshold bit rate value, and wherein the memory includes additional instructions, which when executed by the controller causes the system to perform further operations including:

based on the input bit rate value being greater than the threshold bit rate value, determining the adjustment frequency for the clock rate of the processor is the maximum operating frequency included in the plurality of potential clock rate values.

9. The smart camera system of claim 1, wherein the video data output at the input bit rate has a first average peak signal-to-noise ratio (PSNR) when the clock rate of the processor is at a maximum operational frequency, wherein the video data output at the input bit rate has a second average PSNR when the clock rate of the processor is at the the adjustment frequency, and wherein the second average PSNR is within a threshold confidence interval of the first average PSNR.

10. The smart camera system of claim 9, wherein the threshold confidence interval is a 95% threshold confidence interval.

11. A non-transitory, computer readable storage medium (CRM) including instructions that, when executed by a processor, cause the processor to:

transmit video data stored to memory, the video data initially at a bit rate of a pre-determined bit rate value, wherein while the bit rate of the video data is at the pre-determined bit rate value the processor is operating at a clock rate of a first frequency;

based on receiving an input to change the bit rate of the video data to an input bit rate value, dynamically scale the clock rate of the processor to an adjustment frequency, wherein the adjustment frequency is selected from a set of frequencies for the clock rate of the processor associated with substantially similar image quality at the input bit rate of the video data, and wherein the adjustment frequency is less than any other one of the set of frequencies; and change the bit rate of the video data to the input bit rate value, wherein the input bit rate value is different than the pre-determined bit rate value, and wherein the first frequency is different than the adjustment frequency.

12. The CRM of claim 11, further comprising:

based on the input bit rate value being less than the pre-determined bit rate value, determine the adjustment frequency is less than the first frequency, and wherein a power consumption of the processor is less when transmitting the video data with the bit rate at the input bit rate value relative to the power consumption of the processor when transmitting the video data with the bit rate at the pre-determined bit rate value.

13. The CRM of claim 12, further comprising:

based on the input bit rate value being greater than the pre-determined bit rate value, determine the adjustment frequency is greater than the first frequency, wherein the pre-determined bit rate value is a previously inputted bit rate value, and wherein a power consumption of the processor is greater when transmitting the video data with the bit rate at the input bit rate value relative to the power consumption of the processor when transmitting the video data with the bit rate at the pre-determined bit rate value.

14. The CRM of claim 11, further comprising:

correlate a plurality of potential clock rates for the clock rate of the processor to a corresponding one of a plurality of potential bit rate values for the bit rate of the video data via a quality-to-frequency look up table stored within the memory, wherein the plurality of potential clock rates includes the first frequency and the adjustment frequency, and wherein the plurality of potential bit rate values includes the pre-determined bit rate value and the input bit rate value.

15. The CRM of claim 14, further comprising:
identify a first one of the plurality of potential bit rate values of the quality-to-frequency look up table that corresponds to the input bit rate value; and
determine the adjustment frequency for the clock rate of the processor as one of the plurality of potential clock rates that corresponds to the first one of the plurality of potential bit rate values.

16. The CRM of claim 14, further comprising:
based on the input bit rate value being greater than a threshold bit rate value included in the plurality of potential bit rate values, determine the adjustment frequency for the clock rate of the processor is a maximum operating frequency included in the plurality of potential clock rates.

17. A method for generating a quality-to-frequency look up table for a smart camera system, the method comprising:
outputting a video signal representative of video data with a controller, wherein the video data has a bit rate of a pre-determined bit rate value, wherein the video data is generated by an image sensor coupled to the controller, the controller including a processor initially operating at a clock rate of a first frequency;
while outputting the video signal, adjusting the clock rate of the processor to a plurality of other frequencies, each different than the first frequency;
comparing image quality of the video signal while the clock rate of the processor is at the first frequency to the image quality of the video signal while the clock rate of the processor is at each of the plurality of other frequencies;
identifying a first set of frequencies included in the plurality of other frequencies associated with substantially similar image quality relative to the image quality associated with the first frequency; and
determining an adjustment frequency included in the first set of frequencies, wherein the adjustment frequency is less than any other one of the first set of frequencies.

18. The method of claim 17, further comprising:
determining a plurality of average peak signal-to-noise ratios (PSNR) of the video signal, each associated with a corresponding one of the plurality of other frequencies, wherein the first frequency is associated with a first average PSNR, wherein each of the plurality of average PSNR and the first average PSNR correspond to a metric for the image quality of the video signal.

19. The method of claim 18, wherein a second average PSNR included in the plurality of average PSNR corresponds to the adjustment frequency, and wherein the second average PSNR is to within a first threshold confidence interval of the first average PSNR.

20. The method of claim 17, wherein the first frequency is a maximum operational frequency for the clock rate of the processor.

21. The method of claim 17, further comprising:
generating the quality-to-frequency look up table based, at least in part, on the adjustment frequency being associated with the pre-determined bit rate of the video signal.

* * * * *